United States Patent

Wiedenhoff et al.

Patent Number: 4,682,632
Date of Patent: Jul. 28, 1987

[54] CRACK STOPPING IN PIPELINES

[75] Inventors: Wolfgang Wiedenhoff, Muelheim; Adolf W. Gaertner, Neuss; Gert Vogt, Meerbusch; Claus Weisgerber, Muelheim, all of Fed. Rep. of Germany

[73] Assignee: Mannesmann AG, Duesseldorf, Fed. Rep. of Germany

[21] Appl. No.: 784,829

[22] Filed: Oct. 4, 1985

[51] Int. Cl.⁴ .................................. F16L 9/04
[52] U.S. Cl. .................................. 138/178; 138/150; 138/155
[58] Field of Search .............. 138/150, 153, 155, 178

[56] References Cited

U.S. PATENT DOCUMENTS

| | | | |
|---|---|---|---|
| 1,080,897 | 12/1913 | Davies et al. | 138/150 X |
| 3,096,105 | 7/1963 | Risley | 138/178 X |
| 3,443,600 | 5/1969 | Sherwood | 138/153 |
| 3,698,746 | 10/1972 | Loncaric | 138/178 X |
| 3,746,050 | 7/1973 | Born et al. | 138/150 |
| 4,001,054 | 1/1977 | Makepeace | 138/155 X |
| 4,224,966 | 9/1980 | Somerville | 138/178 X |
| 4,383,556 | 5/1983 | Evgenievich et al. | 138/178 X |
| 4,559,974 | 12/1985 | Fawley | 138/178 X |

Primary Examiner—Stephen Marcus
Assistant Examiner—Mark Thronson
Attorney, Agent, or Firm—Ralf H. Siegemund

[57] ABSTRACT

A short steel pipe for use as a crack stopper is described having externally or internally helically arranged individual notches, perforations or texture changes at such a number that they overlap in axial direction, and an axial line on or in the pipe will traverse at least one of these notches, perforations or texture changes.

5 Claims, 4 Drawing Figures

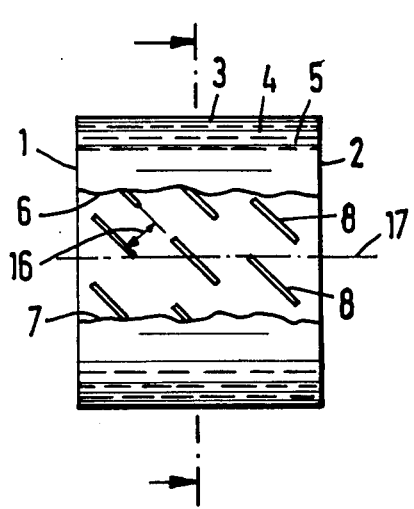
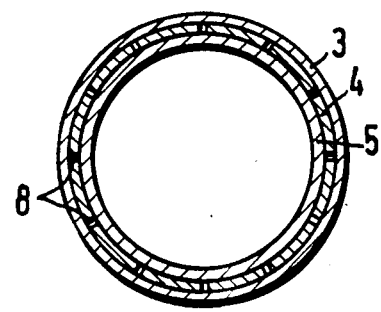
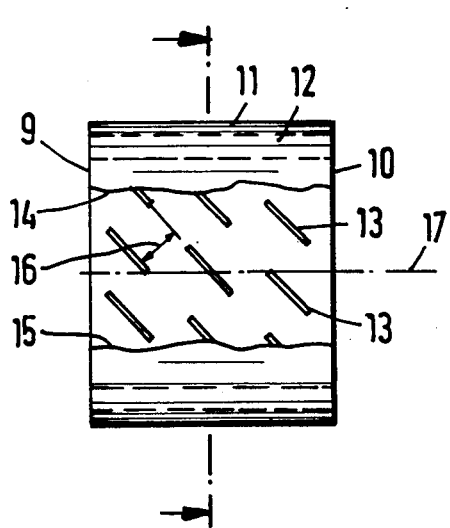
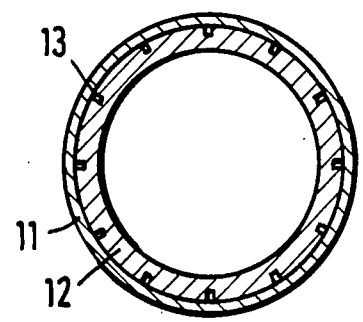

CRACK STOPPING IN PIPELINES

BACKGROUND OF THE INVENTION

The present invention relates to stopping the propagation of cracks in steel pipes, or pipelines used for and in gas conduits with a length of at least of at least 300 mm; a structure for impeding the propagation of such cracks should have an internal diameter equal to the internal diameter of the conduit. Moreover the particular impeding device should have a front face such that it can be butt welded in end-to-end configuration with a member of the conduit.

The conduction of natural gas or crude oil over large distances employs to a considerable extent longitudinally welded tubes or pipes. These pipes should withstand gas pressures of 60 bars and higher. The tubes, or pipes are made from thermo-mechanically rolled sheet or strip or skelp stock and should be amenable to a mechanical expansion for improving the shape and configuration.

In the foregoing the basic background for practicing the invention has been developed under particular consideration of the type of tubes, pipes and their mode of manufacture envisioned here to be improved. These conduits and pipe lines, depending to some extent on the environment in which they are used are to some extent endangered by formation of local cracks and fissures. Even though this may be a rare event a single event may have catastrophic results. This is particularly so as a crack once formed may exhibit the tendency of rapid propagation over long distances. Many proposals have been made and published in order to prevent crack growth and propagation.

European printed patent application No. 7,448,2 includes a comprehensive description of a variety of proposals that have been made here. Generally speaking the technical conditions under which crack propagation has to be prevented can be regarded as generally known. However, for a variety of reasons the various proposals are endowed with drawbacks and deficiencies relating for example to manufacturing techniques or to the effect that is hoped to be obtained but may not always be realized.

In accordance with a known proposal the various conduits should be constructed basically in a laminated fashion; the individual elements being threaded seam pipes. Such a pipe may as far as an individual section is concerned be indeed meet highest safety requirements provided each individual lamina fulfills completely the operating conditions. However, pipes and pipe lines of a thousand km length or more can from a realistic point of view simply not be constructed in this fashion.

Of greater advantage and particularly more realistic are conduits made of longitudinally welded tubes and pipes and wherein within the pipe line so called crack stoppers are included and inserted. Basically one can consider such a crack stopper to be a particularly configured, short pipe, tube or sleeve which replaces over a short section the regular pipe of the pipeline. Examples of such a crack stopper are e.g. shown in U.S. Pat. No. 3,096,105. Local reinforcement is an analogous way of proceeding and is disclosed in German Pat. No. 9,369,81. These proposals, however, are endowed with the drawback that they will be effective if and only if the wall thickness at the pipe at that particular location is strengthened and increased. The pipe, however, must offer in its interior a smooth flow space, without internal constriction, and as far as installation and surface contour is concerned the outside should be smooth too. Clearly any local increase in the tube or pipe wall thickness will not meet those requirements.

DESCRIPTION OF THE INVENTION

It is an object of the present invention to provide a new and improved steel pipe or pipeline being made of longitudinally welded or helically seam welded material and wherein crack stopping is accomplished without offering to the outside or to the inside a contour that differs from the normal pipeline. Moreover the crack stopping device of a facility should be easily manufactured and offer moderate cost with a high degree of reliability as far as preventing crack propagation in the pipeline is concerned.

The invention is based on the recognition that a crack which has formed for one reason or another in a pipeline can introduce a measurable defect in the conduction which still remains within certain technical safety requirements but that it is absolutely necessary to stop the propagation of the crack in order to avoid hazardous conditions. Therefore it is necessary to prevent the migration of a crack with a very high degree of certainty. Moreover, the distribution of crack stoppers in a given conduit and pipeline should be made subject to the particular situation including the degree of safety that is needed i.e. including considerations as to what kind of cracks are tolerable and which are not.

In accordance with the preferred embodiment of the present invention a steel pipe section is suggested for use as crack stopper having an internal diameter as well as an external diameter equal to the diameter of the pipeline in which it is to be inserted whereby the length of this particular crack stopper is to be at least 300 mm. In accordance with the invention this steel pipe is to have notches or texture changes arranged inside the wall or on the outside surface and organized in at least two rows and extending it at an angle between 35 and 70 degress in relation to the axis whereby e.g. in an azimuthal direction the notches or texture changes overlap; any geometric axial line on or in the steel pipe passes at least through one of such notch or texture change. The notches or textures changes as arranged on any one axial line are spaced apart on that line and are, in the direction of the line, between 10 and 100 times as long as they are wide. The depth of the notches and texture change is between 1/10 and 3/5 of the wall thickness of the pipe and have rounded ends.

These notches or elongated texture modifications in accordance with the aspects expounded above ensures the condition that any crack that runs along a geometrical surface line, upon reaching the crack stopper will in fact end in one of these defined notches etc and thus be terminated. Thus one can assume that a pipe provided with notches or texture changes in accordance with the invention and having a particular wall thickness will have the same carrying and conduction capability as a solid pipe of the same wall thickness. Indeed there are local tension increases at the notches particularly but they do not coincide with the direction of the main load on the pipe. Therefore one does not need any transition between a regular conduit and pipeline and the short pipe used as crack stopper.

In addition the requirement has to be fulfilled that the crack stopper is smooth on the inside and on the outside. In order to meet this requirement it is suggested to provide this particular pipe in a laminated fashion using a plurality of strips, layers whereby in one example an internal strip is provided with the notches, even perforations or the texture changes. The strips or concentric tubes may have equal or unequal thickness whereby a thicker strip or tube is arranged at the surface and a thinner one on the inside and is provided with notches as stated. An arrangement with an inner element that is perforated entails at least three lamina: an inner one, an outer one and a middle one which has notches. Additional layers are within the purview of this invention. It was found however that the internal gas pressure experienced at least at the present time do not require more than three layers.

In one form of practicing the invention but not as an essential feature the individual layers may be individually formed into tubes and, possibly after expansion, they are inserted into each other in a telescopic fashion one inside the other. Herein it may be of advantage to heat the respective larger ones so as to provide some minimal expansion for facilitating the insertion; On cooling this expansion retracts thus one will preferably start with an innermost tube, slip onto it another one possibly after heating; after it has cooled down a third tube is slipped on top of the two others which results in an assembly for three tubes or three lamina configuration. Clearly, a larger number of lamina and inserted tubes can be accomodated by this process. Conceivably the entire arrangement of assembled tubing may subsequently be expanded together, preferably mechanically and not hydraulically. All the tubes are relatively short so that they can be telescopically assembled even if the diameter differences are rather small which of course is an advantageous procedure. The individual tubes have been formed from a strip with welding along the edges and may well be necessary to remove the burr of the weld.

Generally speaking the type of notching or perforation is of a secondary nature. In some cases one may use a plain sheet or strip as a blank and the notches are provided through rolling whereby the respective rolls are similar to those used for directly corrugating sheet stock but impressions are basically produced here. In the case one uses a multistrip e.g. a three-strip or layer compound steel pipe, one may use rather narrow strips. A multistrip laminated arrangement if provided with an internal layer may have the latter constructed from helically coiled ribbon or strip. Thus narrow strips can be used generally and welded into tubes with a helical pitch amounting to 40 to 70 degrees. The weld itself may even be used to define row of notches and they will run in the proper direction. The perforations or notches may be provided helically generally, using a tool that is run around the pipe which practice is much possible regardless of whether a single or multi-layer is used. The tools envisioned here may primarily be of the so called finger milling type.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIGS. 1a and 1b respectively show side elevation and cross section of a steel pipe serving as crack stopper in accordance with the preferred embodiment of the present invention; the pipe being in fact of a three-layer configuration with internal perforations; and FIGS. 2a and 2b are respectively side view and cross-sectional view through a two-layer tubing with internal notching on an inner tube and having an outer cover to obtain a two ply laminated construction.

Proceeding now to the detailed description of the drawings FIGS. 1a and 1b show a short steel pipe to be used as crack stopper in that it is inserted in a pipeline for gas. The particular pipe has front faces 1 and 2 by means of which the particular pipe is connected to two ends of and in the pipeline. The pipeline itself may be longitudinally seam welded. The seam of the connection or joint to the crackstopper will run peripherally, and it is assumed that the wall thickness of the pipe shown in FIGS. 1a and 1b is equal to the wall thickness of the pipes in the pipeline in which the crack stoppers are inserted.

The particular crack stopping pipe illustrated has three layers or lamina 3,4 and 5, in a concentric arrangement. In this case then the innermost layer 5 has an internal diameter that is equal to the diameter of the pipeline in which the pipe is inserted. Analogously the outer layer 3 has an outer diameter which again is equal to the outer diameter of the pipe in which this particular pipe is inserted. The length of this particular pipe has about 80% of the outer diameter which may be between 300 and 1500 mm.

As shown particularly in FIG. 1a the middle layer 4 is exposed between fraction lines 6 and 7 showing in effect where the outer layer 3 has been peeled away. The inner layer 4 carries a variety of obliquely oriented elongated elements 8 which may be perforations or long, narrow texture changes. These elements e.g. perforations 8 are arranged peripherally in circles and in a staggered relationship, the staggering to occur in axial direction so that as seen along any axial surface line they do overlap. From a different point of view these elements 8 such as notches 9 are arranged on helical lines wherein notch-space-notch space follow in regular sequence looping around the particular tube which is the tube 4. These elements are at least ten but no more than about hundred times as long as they are wide. Their ends should be rounded which may be the direct result of milling. The elements 8 (or the helical lines on which they are placed) are arranged at a particular angle 16 to the axis which is between 40 and 70 degress. One can also say that each of these perforations follow a helical line and in the direction of any such helical line having a pitch angle 16. The perforations or notches may have a radial thickness amounting to 1/10 to 3/5 of the total wall thickness or depth of the short pipe that is the crack stopper insert for the pipeline and/or the pipeline itself.

In the particular example of FIGS. 1a and 1b these notches 8 may be perforations in the middle layer 4 and have been worked into that layer i.e. into the strip material out of which that layer has been made by means of a milling head. Of course this particular layer may have been made as a separate tube and the perforations may have been cut in thereafter but before the three tubes 3, 4 and 5 have been stuck into each other. After such telescopic insertion the three tube assembly has been mechanically expanded.

In use the resulting pipe or tube is inserted into the pipeline and welded by means of short solid welds along the front faces 1 and 2. Alternatively the particular crack stopper pipe illustrated may be connected first by welding with longer but still fairly short solid longitudinally seam welded pipes so that particular pipe units obtain being comprised of a pipe, a short crack stopper and another pipe having a total length between 10 and 18 meters. The tube or pipe can be made of helically coiled strip with welding seams 20 as shown, not being radially aligned.

FIGS. 2 and 2b show an alternative example for practicing the invention. It is likewise a short pipe with front faces 9 and 10 for connection with solid short tubes. In addition the particular pipe illustrated is comprised of the two layers 11 and 12 with a thinner outer layer or tube 11 and a thicker inner tube or layer 12. This inner tube 12 is on its outer surface provided wtih a plurality of notches i.e. indents 13 which can also be seen in FIG. 2a, along the cutoff borders 14 and 15 illustrating that here for purposes of illustration the outer layer has been removed.

The notches themselves are arranged just in the same manner as the notches in FIG. 1. After the notches have been produced the two tubes 11 and 12 are telescopically inserted and that the tube is inserted in the tube 11 and the assembly is expanded whereupon solid end pieces are welded to the front ends 9 and 10 to obtain again standard kind of length between 10 and 18 m. As stated alternatively, the perforations 8 or notches 13 can be replaced by local texture changes which for example in case of a steel grade 52 in accordance with DIN 1626 and DIN 1628 are in case of thermo-mechanically rolled steel amount to the following: (all percentages by weight) from 0.1 to 0.16% C; from 0.35 to 0.55% Si; from 1.6 to 2.00% Mn; not more than 0.025% P; not more than 0.01% S; a total content of 0.02 to 0.06% Al; 0.07 to 0.14% carbon nitride formation material, the remainder being iron and the texture having been produced without additives by means of WIG, plasma, laser or electron beam welding.

The invention is not limited to the embodiments described above but all changes and modifications thereof, not constituting departures from the spirit and scope of the invention, are intended to be included.

We claim:

1. A steel pipe to serve as crack stopper and to be inserted into a gas pipeline having respectively the same inner diameter the same outer diameter as the pipe, said pipe having front faces for butt welding to elements of the pipeline; the improvement comprising:

said pipe having outer or internal notches or texture changes arranged spaced apart along a plurality of helical lines, the notches or texture changes on any one of the helical lines being spaced apart on said one helical line, the helical lines having a pitch angle from 35 to 70 degrees to the axis, said notches or texture changes being arranged on these lines such that any hypothetical or geometrical axial line in a radial level of these notches or texture changes traverses at least one of the notches or texture changes which overlap accordingly as seen in an axial direction; said notches or texture changes individually being at least 10 but not more than 100 times longer than wide, and having rounded ends, further having a depth or radial dimension which is between about 1/10 and 3/5 of the wall thickness of the pipe.

2. Pipe as in claim 1 being constructed as a multilayer pipe element.

3. Pipe as in claim 2 said layers being made of helically coiled seam welded strip with a helical edge having a pitch equal to the pitch of the helical lines, the respective welding seams in different layers do not overlap radially.

4. Pipe as in claim 2 wherein each of said notches or texture changes are perforations and wherein said perforations are within an internal layer.

5. Pipe as in claim 2 wherein an inner layer is provided with notches.

* * * * *